United States Patent [19]

McIntosh

[11] Patent Number: 5,381,446
[45] Date of Patent: Jan. 10, 1995

[54] DIGITAL IMPLEMENTATION OF SPREAD SPECTRUM COMMUNICATIONS SYSTEM

[75] Inventor: P. Stuckey McIntosh, Atlanta, Ga.

[73] Assignee: Digital Wireless Corp., Atlanta, Ga.

[21] Appl. No.: 81,690

[22] Filed: Jun. 25, 1993

[51] Int. Cl.6 ............................................. H04K 1/00
[52] U.S. Cl. ....................................................... 375/1
[58] Field of Search ........................................... 375/1

[56] References Cited

U.S. PATENT DOCUMENTS

| | | | |
|---|---|---|---|
| 3,931,472 | 1/1976 | Gill | 179/15 |
| 4,017,798 | 4/1977 | Gordy | 375/1 |
| 4,253,067 | 2/1981 | Caples | 329/110 |
| 4,672,658 | 6/1987 | Kavehrad | 375/1 |
| 4,736,392 | 4/1988 | Kammeyer | 375/80 |
| 4,774,715 | 9/1988 | Messenger | 375/1 |
| 4,862,478 | 8/1989 | McIntosh | 375/1 |
| 5,077,753 | 12/1991 | Grau, Jr. | 375/1 |
| 5,081,643 | 1/1992 | Schilling | 375/1 |
| 5,216,693 | 6/1993 | Nakamura | 375/1 |

OTHER PUBLICATIONS

"Digital DPSK Demodulator STEL-2120", Advance Information, *Stanford Telecom*, undated.

Kemdirim, "DS SSMA with Some IC Realizations", *IEEE Journal on Selected Areas in Communications*, vol. 8, No. 4, May 1990, pp. 663–674.

Kuehls, "Presence Detection of Binary-Phase-Shif-Keyed and Direct-Sequence Spread-Spectrum Signals Using a Prefilter-Delay-and-and-Multiply Device", *IEEE Journal on Selected Areas in communications*, vol. 8, No. 5, Jun. 1990, pp. 915–933.

*Primary Examiner*—Salvatore Cangialosi
*Attorney, Agent, or Firm*—Pollock, Vande Sande & Priddy

[57] ABSTRACT

The present invention comprises a digital implementation of a spread spectrum communications system including a spread spectrum modulator or transmitter and a spread spectrum receiver or demodulator. The demodulator, as modified with optional techniques, operates at zero IF. Under these circumstances, the receiver is susceptible to 1/F noise, as well as transient overloads. The addition of a high pass filter stage to only the receiver, in a communications system, without modifying the transmitter, will be recognized by those skilled in the art as violating basic precepts of communications which attempt to tailor the characteristics of a receiver and transmitter to each other. However, applicant has found that demodulating RZ encoded data with an added high pass filter results in the production of Manchester data which is one of the forms of data encoding that can be handled by the demodulator.

8 Claims, 4 Drawing Sheets

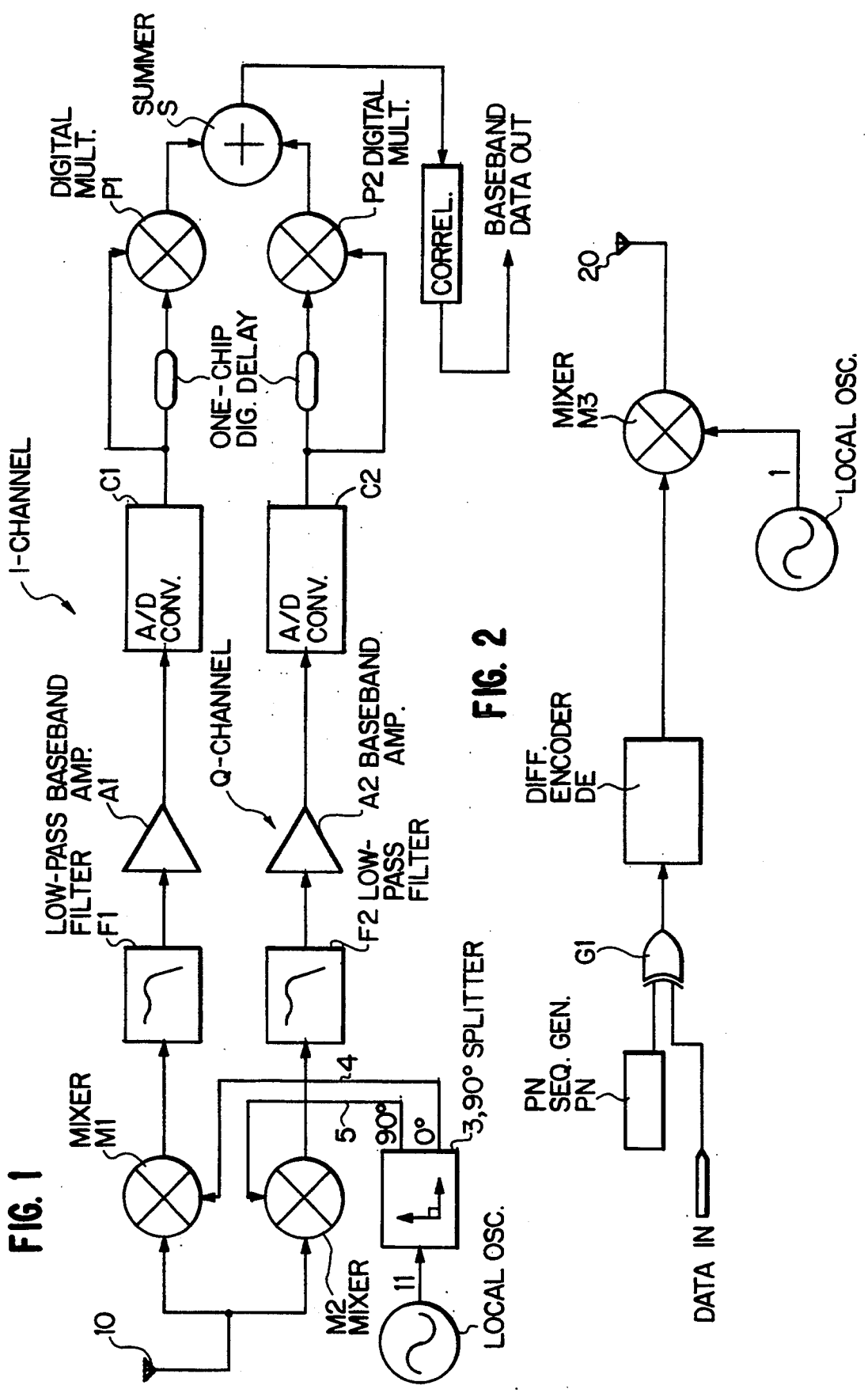

DIGITAL IMPLEMENTATION OF SPREAD SPECTRUM COMMUNICATIONS SYSTEM

TECHNICAL FIELD

The present invention relates to spread spectrum communications systems.

RELATED APPLICATIONS

Co-pending application Ser. No. 08/081,689, filed Jun. 25, 1993 discloses synchronization of transmit and receive events in a half-duplex "ping-pong" radio link.

Co-pending application Ser. No. 08/084,978, filed Jun. 25, 1993 discloses a minimal logic correlator.

Co-pending application Ser. No. 08/081,989, filed Jun. 25, 1993 discloses a method and apparatus for synchronization between real-time sampled audio applications operating full-duplex over a half-duplex radio link.

Each of the above-identified applications is assigned to the assignee of this application and the subject matter incorporated herein by this reference.

BACKGROUND

An important criterion of spread spectrum operation is resistance to multi-path interference. It is well known (see Dixon, *Spread Spectrum Systems*, 2nd Edition, page 275, 1984) that direct sequence spread systems exhibit resistance to multi-path for differential delays greater than a chip width. This resistance results from the fact that a signal which is delayed by more than a chip width is no longer correlated with a direct or desired signal and, presumably, is rejected as interference by a correlator which is aligned to the timing of the direct or desired signal.

In urban and indoor radio systems, multi-path differential delay spreads range from 10 to 125 nanoseconds in homes and offices. In large, enclosed arenas, exhibit halls and sports pavilions, delay spreads range from 25 nanoseconds to over one $\mu$sec. Outdoors in urban areas, delay spreads can range from 50 nanoseconds to over three $\mu$sec. In order for a conventional direct sequence spread spectrum communications system to exhibit significant multi-path resistance over the entire range listed above (i.e. differential delays spread less than a chip width), it must operate at chip rates on the order of 50-100 megachips per second. In commercial applications, this is not practical because of bandwidth restrictions and digital logic speed limitations. The present invention provides a different approach, namely, employing modulation and demodulation schemes that inherently have resistance to multi-path and whose performance is enhanced by incorporation of direct sequence spread spectrum techniques. In this regard, see McIntosh U.S. Pat. No. 4,862,478 which describes systems exhibiting inherent resistance to multi-path interference. The present invention is directed at achieving the same end, i.e. resistance to multi-path interference. In contrast to the system described in U.S. Pat. No. 4,862,478, the present invention improves on the manufactureability. In particular, the present invention improves on the system of Pat. 4,862,478 in two areas. As is described in detail hereinafter, the demodulator or receiver operates at zero IF. In addition, by using an A/D converter prior to recovering the baseband modulation, the delays can be digitally implemented.

SUMMARY OF THE INVENTION

The present invention comprises a digital implementation of a spread spectrum communications system including a spread spectrum modulator or transmitter and a spread spectrum receiver or demodulator. FIG. 1 shows a demodulator which can be used with the modulator of FIGS. 2, 3 or 4. FIGS. 5 and 7 show optional variations on the demodulator of FIG. 1.

As is described below, the demodulator of FIG. 1 or that demodulator as modified with the optional techniques of FIGS. 5 and 7, operates at zero IF. Under these circumstances, the receiver is susceptible to 1/F noise, as well as transient overloads. Adding a high pass filter in I and Q channels, as shown in FIG. 6, is advantageous. As is described hereinafter, the addition of a high pass filter stage to only the receiver in a communications system, without modifying the transmitter, will be recognized by those skilled in the art as violating basic precepts of communications which attempt to tailor the characteristics of a receiver and transmitter to each other. However, applicant has found that demodulating RZ encoded data with an added high pass filter as shown in FIG. 6, results in the production of Manchester encoded data which is one of the forms of data encoding that can be handled by the demodulator.

BRIEF DESCRIPTION OF THE DRAWINGS

The present invention will now be described in the following portions of this specification when taken in conjunction with the attached drawings in which:

FIG. 1 is a block diagram of a suitable demodulator;

FIGS. 2, 3 and 4 illustrate suitable forms of a modulator;

DETAILED DESCRIPTION OF PREFERRED EMBODIMENTS

Figure 3:
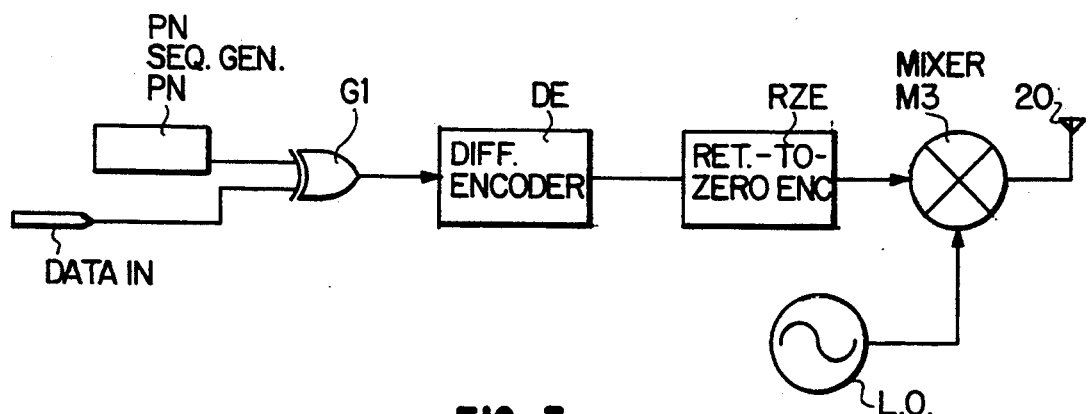

FIG. 1 illustrates a demodulator which can be beneficially employed in accordance with the present invention. FIG. 1 and other drawings herein omit conventional apparatus such as bandpass filters (for example, a broadband filter passing 902-928 MHz), low noise amplifiers, etc. FIG. 1 shows that an RF signal is fed, via antenna 10, to a pair of mixers, M1 and M2. Mixers M1 and M2 are driven by a local oscillator signal (from LO1) which is supplied in quadrature by quadrature divider 3. M1 is driven by a 0° phase shifted LO signal on line 4, while M2 is driven by 90° phase shifted LO signal on line 5. LO1 is set to a frequency that is near to but not necessarily identical to the center frequency of the transmitted signal, i.e. LO1 need not be phase locked or even frequency locked to the incoming signal. The output of M1 and M2 produces both in-phase (I-channel) and quadrature (Q-channel) baseband outputs at the respective mixers. All of the information that previously existed in the bandpass (double-sided) RF spectrum at the input to the antenna now has been split into a pair of baseband signals. At the same time, phaser rotation which may exist between the transmitted signal and the frequency of LO1 has been added to both the I and Q outputs and its influence must be later removed if the desired signal (the modulator input signal) is to be recovered.

The outputs from each of the mixers is provided to a respective low pass filter F1 and F2. This low pass filtering in the I and Q outputs and the direct-demodulation (homodyne) receiver takes the place of IF filtering in a conventional superheterodyne receiver. This is a potential cost reduction. The I and Q baseband signals are then separately amplified (A1 and A2) and applied to respective A/D converters C1 and C2. The output of the converters C1 and C2 are quantized either in single bit (i.e. by a simple comparator) process or by a multi-level process. The resulting digitized signal is then fed into respective one chip delays D1 and D2. The delays may be readily implemented as a multiple stage shift register whose length corresponds to a single chip to achieve a 1-chip delay in the signal. The depth of the register corresponds to the resolution of the converters C1 and C2. The delayed output is then digitally multiplied in the respective multiplier (P1 and P2) by the quantized signal to produce a pair of differentially demodulated outputs. Summing these outputs together in the summers produces a digital representation of the original modulator signal, with any phaser rotation that might have existed between the transmitter and receiver having been removed. The output of the summer can then be de-spread by a variety of digital spread spectrum elements. One suitable correlator is described in the copending application Ser. No. 08/084,978, filed Jun. 25, 1993. FIG. 1 shows the use of a correlator. The demodulator of FIG. 1 works well with any of three different modulation formats: (1) ordinary differential encoding (DE), shown in FIG. 2; (2) different encoding plus return-to-zero encoding (RZ/DE), shown in FIG. 3; or (3) differential encoding plus Manchester encoding (MC/DE), shown in FIG. 4.

FIG. 2 shows a modulator which can be used with the demodulator of FIG. 1. The modulator of FIG. 2 employs differential encoding. A PN sequence generator PN cyclically generates a particular code word comprising n chips and provides its serial output as one input to an exclusive OR gate G1. The other input to the exclusive OR gate G1 is the data to be transmitted. As those skilled in the art are aware, the PN sequence generator is clocked at a multiple n times the rate of the data such that each data bit is presented to the exclusive OR gate during the period when an entire code word is presented to the other input of the exclusive OR gate G1. The output of the exclusive OR gate is provided as an input to a differential encoder DE whose output is provided to a mixer M3. The other input to the mixer is the output of a local oscillator LO. As is well understood in the art, the output of the mixer M3 is the output of the differential encoder modulated on the local oscillator signal. This composite signal is then transmitted via the antenna 20 and a power amplifier (not illustrated).

FIG. 3 shows another modulator which can be used with the demodulator of FIG. 1. The modulator of FIG. 3 performs differential and RZ encoding. The only difference between the modulators of FIGS. 2 and 3 is that the modulator of FIG. 3 has a return-to-zero encoder RZE inserted between the differential encoder DE and the mixer.

Figure 8:
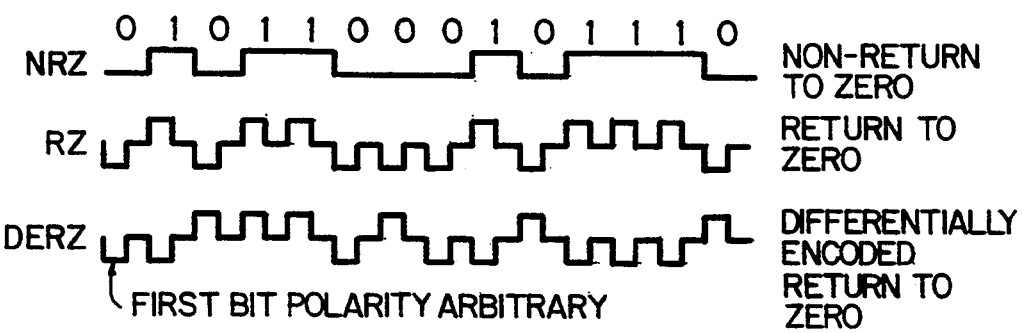
FIG. 8 illustrates waveforms useful in defining return-to-zero encoding format.

Because the return-to-zero format is sometimes characterized differently, reference is made to FIG. 8 which shows a return-to-zero format. The upper line on FIG. 8 (referenced NRZ) shows a digital waveform in non-return-to-zero format for the bit pattern 0-1-0-1-1-0-0-0-1-0-1-1-1-0. As used in this application, return-to-zero is a three-level waveform wherein a first binary signal (such as zero) is represented as a negative pulse, a second binary signal (such as a one) is represented as a positive pulse and each bit is separated from its adjacent bit by a region of no activity or zero level. Thus the same digital bit pattern is shown in the second line of FIG. 8 (referenced RZ) in return-to-zero format. Comparing the lines referenced NRZ and RZ, it will be appreciated that each bit time of NRZ has been divided in half. The first half of the bit time carries a negative or positive pulse identifying whether the particular bit is a zero or a one, respectively. The second half of each bit time, the waveform is at zero level. The last line of FIG. 8 (referenced DERZ) illustrates the bit pattern in differentially encoded, return-to-zero format. In this format, a one bit is transmitted as a pulse of the same polarity as the previous pulse and a zero bit is transmitted as a pulse of the opposite polarity from the previous pulse. It will be apparent from this definition that the polarity of the initial pulse is arbitrary. Those skilled in the art will be capable of correlating these rules with the waveforms referenced NRZ, RZ and DERZ in FIG. 8, illustrating the digital bit stream 0-1-0-1-1-0-0-0-1-0-1-1-1-0.

Figure 4:
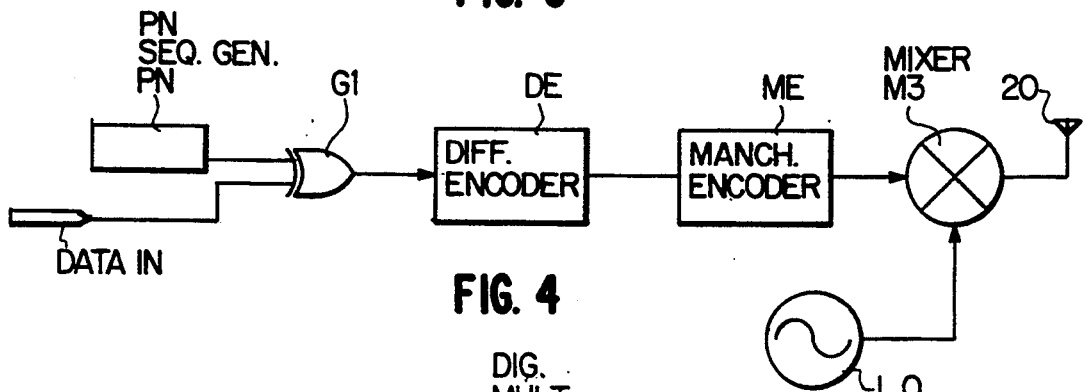

FIG. 4 illustrates another modulator which can be used with the demodulator of FIG. 1. The modulator of FIG. 4 performs differential and Manchester encoding. The only difference between the modulator of FIG. 4 and that of FIG. 2 is that a Manchester encoder ME is inserted between the output of the differential encoder DE and the input of the mixer M3.

Figure 5:
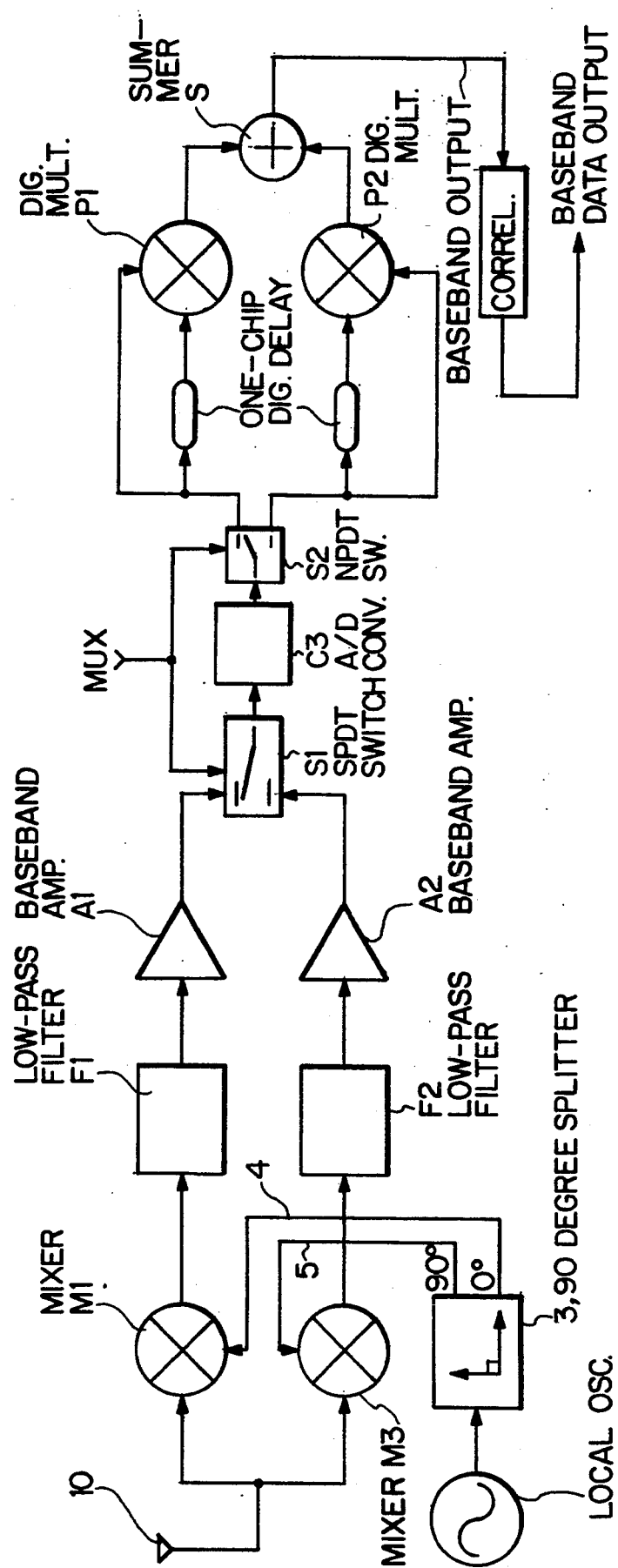
FIG. 5 illustrates an alternative demodulator structure, alternative to that of FIG. 1.

FIG. 5 illustrates an alternative demodulator to that of the demodulator of FIG. 1. The only difference between the demodulator of FIG. 5 and that of FIG. 1 is that a single A/D converter C3 is multiplexed to serve the outputs of both the I and Q channels. As shown in FIG. 5, whereas the amplifiers A1 and A2 are associated with respective A/D converters C1 and C2, in FIG. 1, the output of the amplifiers A1 and A2 are coupled to inputs of a single pole, double throw switch S1. The output of the switch S1 is coupled to an A/D converter C3. The output of the A/D converter C3 is coupled to an input of a single poll, double throw switch S2. The outputs of the switch S2 are inputs to the digital delays and multipliers P1 and P2 in a manner similar to that shown in FIG. 1. The switches S1 and S2 are driven by a multiplexing signal identified as MUX. In order to perform the A/D digital conversion for both the I and Q channels, the A/D converter C3 operates at twice the rate of A/D converters C1 and C2 (FIG. 1). The switches S1 and S2 operate synchronously to share the services of the A/D converter C3, first to the I channel (the output of the amplifier A1) and then to the Q channel (the output of the amplifier A2).

Figure 7:
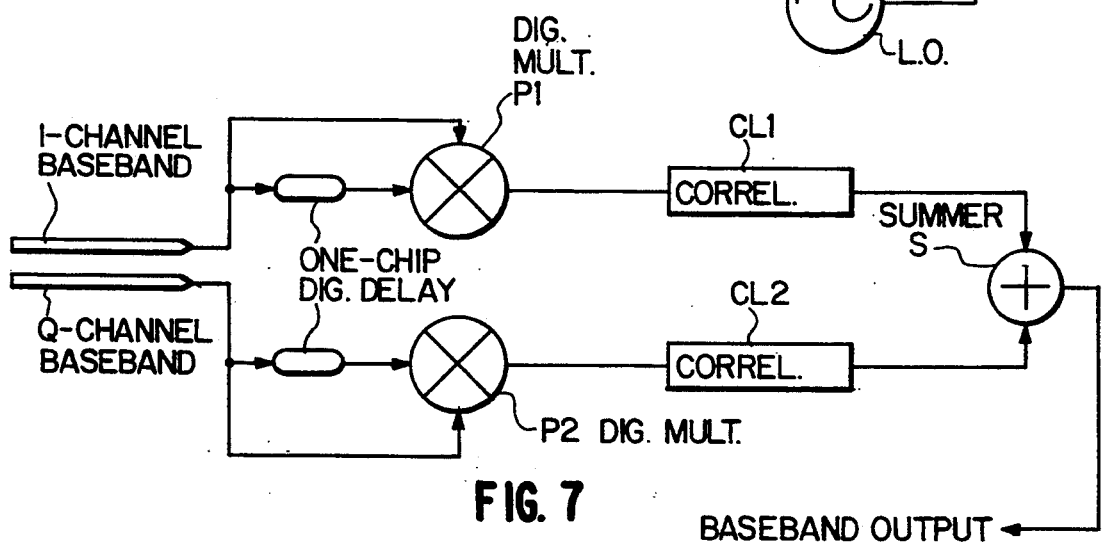
FIG. 7 is an alternative baseband modulation recovery structure which can be used in lieu of the corresponding structure of FIGS. 1 or 5.

FIG. 7 shows another variation on a demodulator. Whereas the demodulator of FIG. 1 first summed the processed I and Q channels before providing the output to a correlator, the demodulator of FIG. 7 employs correlators CL1 and CL2, one for the processed I channel and another for the processed Q channel. It is the outputs of the correlators then which are summed at S.

Figure 6:
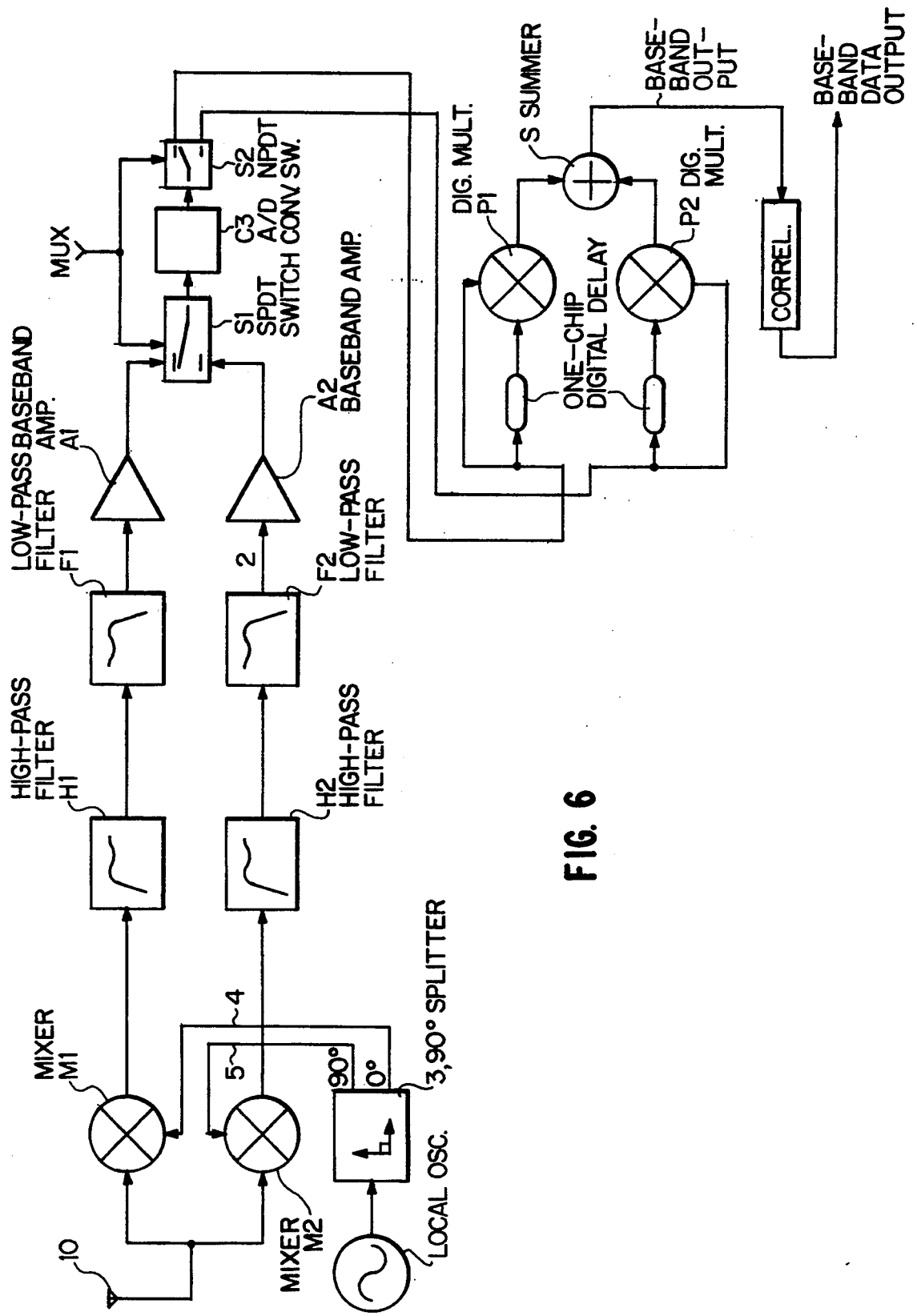
FIG. 6 is a variant employing high pass filtering to reduce the sensitivity of the receiver to 1/F noise and limits its refractory period.

FIG. 6 shows a further alternative to the demodulator. FIG. 6 differs from the demodulator of FIG. 5 by the presence of high pass filters H1 and H2, one in each of the I and Q channels. While FIG. 6 is drawn as a variant of FIG. 5, those skilled in the art will understand that the same high pass filter structure (H1 and H2) of FIG. 6 can be employed in the demodulator of FIG. 1 as well. The preceding discussion has pointed out that the demodulator of FIGS. 1, 5 or 7 can be paired with any of the modulators of FIGS. 2, 3 or 4, i.e. differential encoding, differential and RZ encoding, or differential and Manchester encoding. The demodulator of FIG. 6, however, has added a high pass filter. Inserting a high pass filter into an operable demodulator would appear to violate one of the basic precepts of proper communications system design in that the bandpass shape of the receiver is no longer tailored to match the spectrum of the transmitter, i.e. some of the transmitted energy is discarded or not used at the receiver. It has been discovered, however, that inasmuch as the high pass filtering is a form of differentiation, it is complementary to a theoretical integration at the modulator. Thus, if the modulator used Manchester coding and a subsequent integration stage, the high pass filtering in the demodulator would complement the integration at the modulator and result in the recovery of the original Manchester encoding. It is therefore possible to use the demodulator of FIG. 6 (which has a "extra" high pass filter stage) in combination with a modulator operating under RZ encoding and recover, at the demodulator, the Manchester coding corresponding to the RZ encoding actually employed at the modulator. Absent some benefit obtained by adding the high pass filtering stage, there would be no point in using this additional circuitry. There is, however, a significant added benefit.

Either the demodulator of FIG. 1 or the demodulator of FIGS. 5 or 7, since they operate at what could be considered "zero IF", i.e. an IF which is centered at DC or the zero frequency, exhibit 1/f noise in the mixers M1 and M2 as well as in the baseband amplifiers A1 and A2. This noise can degrade performance. In addition, and because the baseband amplifiers couple low frequency signals, the receiver can exhibit a long settling transient whenever it is overloaded. In time division duplexed radio systems, it is conventional to have a transmitter and receiver share a common antenna. Usually this is accomplished in an arrangement called a receiver/transmit or T/R switch. The T/R switch acts to divert a majority of the transmitted signal from the transmitter to the antenna and away from the receiver. However, attenuation in the T/R switch seldom exceeds 20 dB. This means that using a 1-watt transmitter, 10 milliwatts are fed directly into the receiver. For a sensitive receiver, such as those described herein, that energy can well result in a transient overload condition.

When the transient overload terminates, the receiver will have a refractory period during which it is unable to receive and properly process signals. A relatively sensitive receiver must be able to detect signals that are on the order of −90 dBm. This means that the difference between the transmit overload condition and the expected minimum signal is 100 dB or more. In time division multiplex and time division duplex systems, it is desirable to have the receiver refractory period be as short as possible. This conclusion flows from the fact that the refractory period is essentially dead time and subtracts from the data carrying capacity of the system.

The problem of 1/f noise and refractory period recovery can be addressed by a simple high pass filtering of the baseband signals, as is illustrated in FIG. 6.

As has already been mentioned, an RZ modulated signal that is received and then high pass filtered will emerge from the demodulator (input to the correlator) as a Manchester encoded signal. The Manchester code is one of the formats that is compatible with this particular demodulator.

The cutoff frequencies for the high pass filter H1 or H2) as well as the cutoff frequency for the low pass filter (F1, F2) can be selected in dependence on the data rate although those skilled in the art will understand that there is a range of cutoff frequencies which is suitable. Typically, the cutoff frequency for the high pass filter would be approximately 50% of the transmission bit rate, whereas the cutoff frequency for the low pass filter is generally about 150% of the bit rate, for the devices described herein. For example, assuming a 500 Kb/sec data rate, a suitable cutoff frequency for the high pass filters would be about 250 KHz. A suitable cutoff frequency for the low pass filter would be about 1.25 MHz. In other applications, for example where conventional NRZ data is transmitted, a suitable cutoff frequency for the low pass filter would be about 50%–70% of the bit rate. For the embodiments described herein using RZ coding (which doubles the bandwidth), a higher cutoff frequency with low pass filter (e.g. the 150% typical value) is desirable. As an alternative to discrete high pass and low pass filters, a suitable frequency response, in some cases, can be achieved with a single bandpass filter or filter function. While this is at times suitable, it is generally more practical to place a discrete low pass filter ahead of the baseband amplifiers and in some cases to distribute the high pass filter function through several AC coupling points in the baseband amplifiers.

It should be apparent from a review of this application that many changes can be made within the spirit and scope of the invention which is to be construed in accordance with the claims appended hereto and is not to be limited by the specific embodiments described herein.

I claim:

1. A receiver for a direct sequence spread spectrum signal comprising:
   a) converting means responsive to a radio frequency direct sequence spread spectrum modulated signal for generating a base band replica of said direct sequence spread spectrum modulated signal,
   b) a digital demodulator responsive to said base band replica of said direct sequence spread spectrum modulated signal, said digital demodulator comprising;
      b1) analog to digital converter means for generating stream of digital signals from said base band replica of said direct sequence spread spectrum modulated signal,
      b2) digital delay means for selectively delaying said digital signals to produce delayed digital signals,
      b3) digital multiplier means responsive to said digital signals and to said delayed digital signals for producing a digital product, and
   c) correlator means responsive to said digital product and to a representation of a selected chip sequence for producing a base band digital output.

2. A receiver as recited in claim 1 wherein said converting means includes:
   a1) a pair of mixers, a first of said mixers responsive to a received radio frequency signal and to an output of a local oscillator for producing an I channel base band signal, a second of said mixers responsive to said received radio frequency signal and to a phase shifted output of said local oscillator for producing an Q channel base band signal, and a2) a pair of low pass filters, a first of said low pass filters responsive to said I channel base band signal and a second of said low pass filters responsive to said Q channel base band signals.

3. A receiver as recited in claim 2 which further includes a pair of high pass filters, each of said high pass filters coupled between one of said mixers and one of said low pass filters.

4. A receiver as recited in claim 2 wherein said analog to digital converter means includes:

a pair of analog to digital converters, a first of said analog to digital converters responsive to said I channel signal for producing a digital stream of I channel digital signals, a second of said analog to digital converters responsive to said Q channel signal for producing a digital stream of Q channel digital signals.

5. A receiver as recited in claim 2 wherein said analog to digital converter means comprises an analog to digital converter ans multiplexing means for time sharing said analog to digital converter between said I and Q channel signals to produce I channel and Q channel digital signals.

6. A receiver as recited in claim 4 or in claim 5 b21) wherein said digital delay means comprises a pair of selective digital delays, a first of said digital delays coupled to said I channel digital signals and generating a delayed I channel digital signal, a second of said digital delays coupled to said Q channel digital signals and generating a delayed Q channel digital signal, b31) wherein said digital multiplier means comprises a pair of digital multipliers, a first of said digital multipliers responsive to said I channel and to said delayed I channel digital signals to produce an I channel digital product output, a second of said digital multipliers responsive to said Q channel and to said delayed Q channel digital signals to produce an Q channel digital product output and b4) said digital demodulator further includes a summing device responsive to said I channel and said Q channel digital product outputs for generating said base band digital output.

7. A receiver as recited in claim 6 wherein each said selective digital delays include a shift register and a clock signal source of a selectable clock rate whereby said digital delays interpose a selective delay in accordance with a selected clock rate.

8. A receiver as recited in claim 1 wherein said digital delay means produces I and Q channel digital signals, said multiplier means includes a digital multiplier and multiplexing means for time sharing said digital multiplier among said I and Q channel digital signals.

* * * * *